Figure 1:
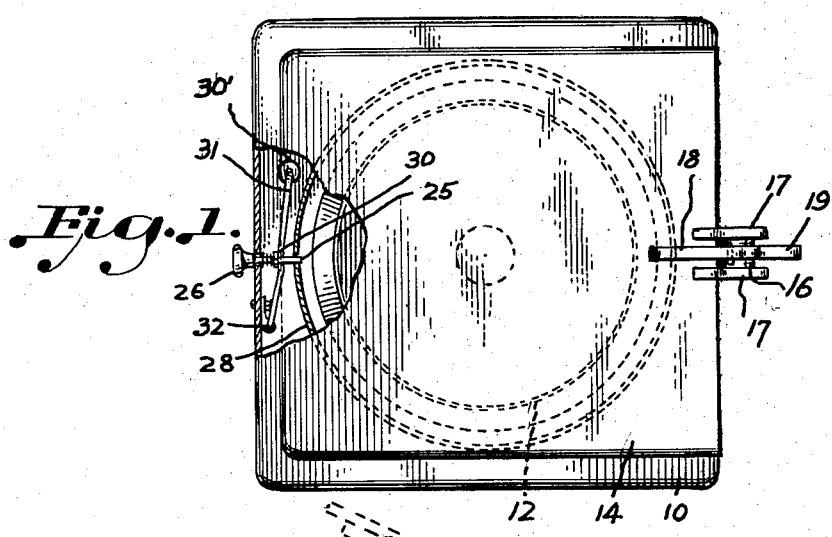

Nov. 11, 1958 — N. S. McEWEN — 2,859,536
AUTOMATIC LID RELEASE FOR CLOTHES EXTRACTOR
Filed Nov. 12, 1957 — 2 Sheets-Sheet 1

INVENTOR.
Norman S. McEwen,
BY
ATTY.

Nov. 11, 1958  N. S. McEWEN  2,859,536
AUTOMATIC LID RELEASE FOR CLOTHES EXTRACTOR
Filed Nov. 12, 1957  2 Sheets-Sheet 2

INVENTOR.
Norman S. McEwen,
BY
ATTY.

United States Patent Office 2,859,536
Patented Nov. 11, 1958

2,859,536

AUTOMATIC LID RELEASE FOR CLOTHES EXTRACTOR

Norman S. McEwen, Fort Lauderdale, Fla., assignor to Helpy Selfy Service Systems, Inc., Atlanta, Ga., a corporation of Florida Application November 12, 1957, Serial No. 695,957

6 Claims. (Cl. 34—58)

This invention relates generally to wash drying laundry apparatus.

Some types of wash driers include a casing having a rotatable motor driven extractor basket arranged therein for reception of the wash to be moisture extracted or dried and wherein the lid or cover is pivoted over the top of the extractor basket and is held in closed position by a spring urged latch. The structure also includes mechanism associated with the hinged lid which operates to energize the motor when the lid is closed but which also operates to stop the motor when the lid is raised. The lid is provided with a spring tending normally to raise the lid, so that immediately the latch is moved to releasing position the lid flys open and the motor is stopped. Also usually associated with extractors of this type is a brake which operates through movement of the lid simultaneously with the motor stopping apparatus for engaging the extractor and bringing the rotating basket to an immediate stop.

In instances where the extractor basket is filled to its normal level no difficulty is encountered, but in those instances where the basket is either improperly filled or is filled beyond its proper capacity portions of the clothing constituting the wash project beyond the open end of the extractor basket and by centrifugal action are brought into forcible contact with the inner parts of the casing to the damage or injury of the material being dried.

The primary object of the present invention is to provide means in connection with that type of extractor here mentioned whereby any goods or material projecting beyond the open end or the rim of the extractor basket will engage and operate means for releasing the lid holding latch, allowing the latter to be free under impulse of the spring to move to open position, thus deenergizing the motor and applying the brake so as to bring the basket to an immediate stop, whereby to prevent injury or damage either to the wash or to the machine itself.

A further object of the invention is to provide means for accomplishment of the results stated which is of extremely simple construction, which may be readily applied to machines of the character stated now in use without difficulty or alteration of the mechanism thereof and which will effectively accomplish the objective.

A further object is to provide lid latch releasing means which is constructed and assembled in the extracting machine in such manner as to reliably operate at all times and which is so constructed and arranged as to minimize the opportunity for wear, breakage or derangement.

With the foregoing objects in view, together with others which will appear as the description proceeds, the invention resides in the novel construction, combination and arrangement of parts, all as will be described more fully hereinafter, illustrated in the drawings and particularly pointed out in the claims.

Figure 2:
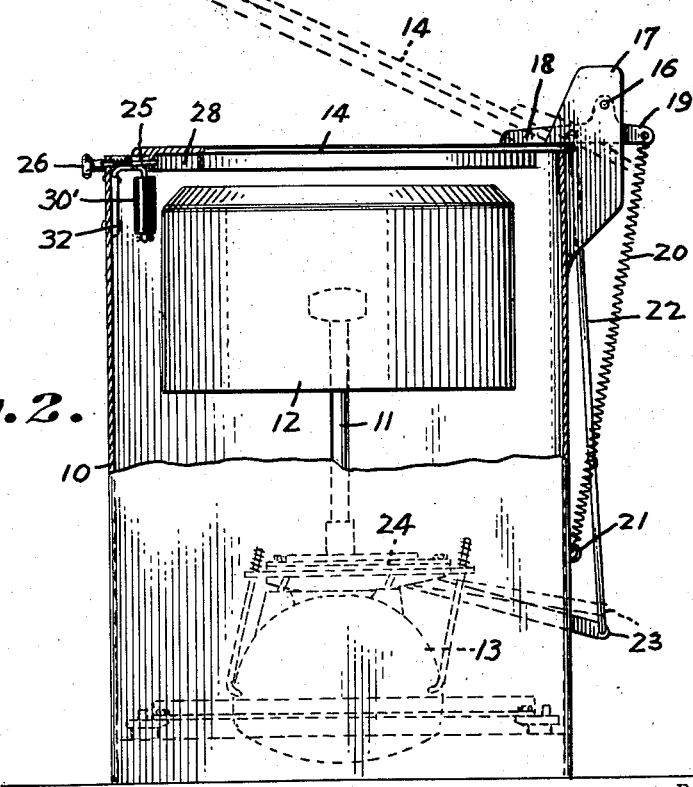
Figure 3:
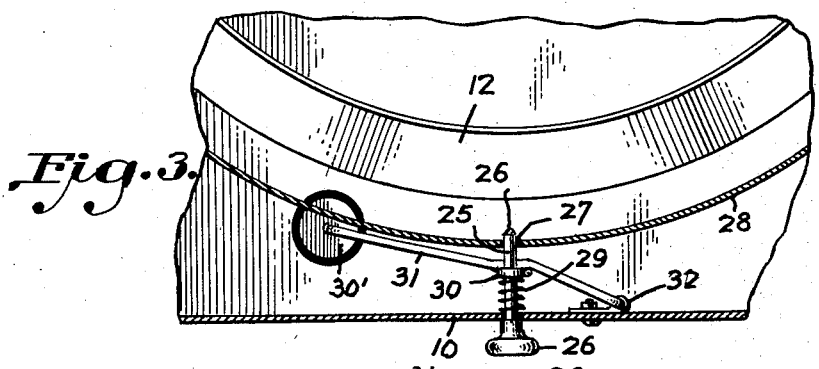
Figure 4:
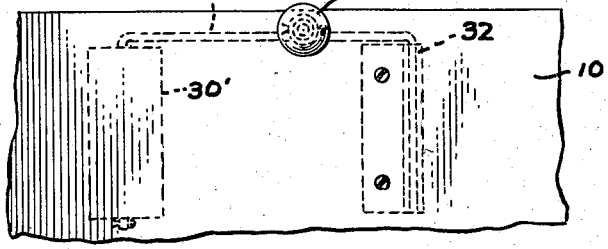
Figure 5:
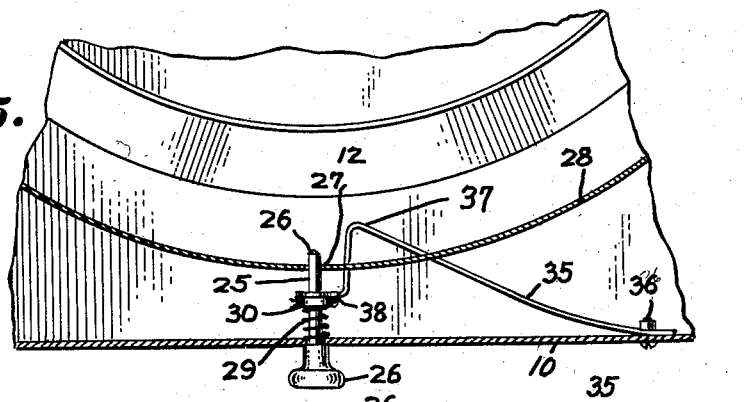
Figure 6:
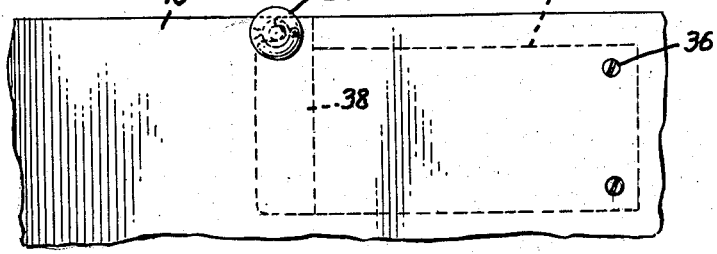
Figure 7:

In the drawing:

Fig. 1 is a top plan view of a clothes extractor of the type generally stated, parts being broken away to disclose the construction and assembly of one type of latch releasing mechanism, Fig. 2 is a side elevation of the extractor shown in Fig. 1, with parts broken away to disclose the interior thereof, Fig. 3 is an enlarged fragmentary sectional view similar to Fig. 1 and illustrating the specific construction of the latch releasing mechanism, Fig. 4 is a front elevation of a part of the extractor casing and illustrating in dotted lines the manner in which the latch released arm operates upon the latch, Fig. 5 is a view similar to Fig. 3 and illustrating a slight modification of the latch releasing means, Fig. 6 is a view similar to Fig. 4 and showing in dotted lines the releasing means illustrated more particularly in Fig. 5, and Fig. 7 is a detail view of a portion of the spring plate constituting the latch releasing mechanism and showing how the same is constructed for operation with the latch.

Referring now to the drawings, and particularly to Figs. 1 and 2 thereof, the extractor includes a casing 10 of substantially rectangular form having mounted therein a central vertically disposed shaft 11 which supports the circular extractor basket 12 open at its upper end as shown for the accommodation of the clothes or materials to be dried. This shaft is supported by a motor suitably mounted in the base of the housing 10 within a shell or casing indicated at 13, which motor will be electrically operated as will be understood.

The cover or lid for the casing is indicated at 14. This lid is of sufficient area to entirely cover the upper open end of the housing when in lowered or closed position shown by full lines in Figs. 1 and 2, but may be swung to open position, as shown by dotted lines in Fig. 2, in order that access may be had to the extractor basket 12. It will be observed that the upper open end of the extractor basket is disposed beneath and in close proximity to the upper end of the housing 10.

Pivoted as at 16 inwardly of its ends to suitable spaced brackets 17 affixed to the rear of the housing 10 and midway the ends thereof is an operating lever 18, the forward end of which overlies and is rigidly connected with the lid 14 while its rear end 19 projects outwardly from the rear of the housing. This outwardly projecting rear end 19 of the lever has connected thereto one end of a contractile spring 20 whose opposite end is secured as at 21 to the lower part of the housing. Connected at its upper end to the lever 18 forwardly of the pivot 16 is one end of a rod 22 whose lower end is connected to the outer end of a motor and brake control lever 23. This lever extends into the housing 10 and controls a switch (not shown) which energizes the motor when the lever 23 is raised but breaks the power connection when lowered. Inasmuch as switches of this type operated by a swinging lever are in common use and form no part of the present invention, it is deemed unnecessary to illustrate such structure in detail. The lever 23 also when lowered releases a brake for the shaft 11 indicated at 24 by dotted lines, and while it will be understood that any desired type of brake for the shaft may be utilized, the type of brake here generally represented is described and claimed in my prior Patent of the United States No. 2,757,759, dated August 7, 1956. It will be understood, however, that any desired type of electric switch or brake may be utilized so long as they operate simultaneously to close the electric circuit through the motor and release the brake when the lever is moved in one direction, and to break the circuit and to apply the brake simultaneously when the lever is moved in the opposite direction. The tension of the spring 20 may be regulated in any desired manner and is sufficient to raise the lid 14 and lower the rod 22 when the lid is released, but when the lid is in closed position, as shown by full lines in Fig. 2, the spring is tensioned.

The latch means for holding the lid 14 in closed position in the type of extractor here under consideration comprises a latch pin 25 extending through the forward end of the housing 10 immediately below the upper edge thereof, this pin having a knob 26 on its outer end by which it may be conveniently manipulated. The inner end of this latch pin extends through an opening 27 in the skirt 28 depending from the lid 14, and an expansion spring 29 encircles the pin and bears at one end against the housing 10 and at its opposite end against a collar 30 affixed to the shank of the latch pin 25. The spring, therefore, normally holds the pin engaged in the skirt of the lip 14. This is standard construction in extractors of the type here involved.

The one form of the attachment for bringing about automatic release of the cover or top 14 to the action of contractile spring 20 is illustrated in Figs. 1 to 4 inclusive. A rod 31 is hingedly connected at one end as at 32 in a bracket affixed to the interior of the housing 10 in offset relationship to the latch pin 26. This rod extends beneath the latch pin and is engaged inwardly of its ends by the collar 30 which encircles the latch pin. The free end of the rod 31 rotatably carries a roller 30' which has its axis disposed in parallelism with the axis of the rotating basket. This roller may be formed of rubber or other resilient material, or may have its outer surface covered with either rubber or plastic so as to offer no damaging resistance to any clothing with which it may be engaged in the operation of the machine. The rod swings in a horizontal plane, and when the spring 29 forces the latch pin into locking engagement with the skirt 28 of the lid, the roller 30' is disposed in close proximity to the adjacent edge of the extractor basket.

Under normal operating conditions, if the basket is properly filled, it performs its extracting operation without operating the latch releasing mechanism, however, should the basket be improperly filled, or should any of the contents of the basket have portions thereof thrown beyond the periphery of the basket by centrifugal force, such protruding portions will strike against the roller 30' forcing the same outwardly of the basket, carrying with it the latch pin 26 against the tension of spring 29. When the inner end of the latch pin passes from the recess 27 in the skirt 28, the lid is immediately released to the action of the spring 20, whereupon the rod 22 is forced downwardly carrying with it the control lever 23 which operates to break the circuit of the motor and to simultaneously set the brake 24. This operation brings the basket immediately to a standstill and no damage can occur. It will be noted that the roller 30' is elongated so as to lie in the path of any goods which may protrude from the periphery of the basket edge during rotation of the latter.

In Figs. 5, 6 and 7, there is illustrated a modified form of latch release which departs slightly from the structure shown in the remaining figures. In this form, an elongated spring plate 35 is secured at one end as at 36 to the interior of the casing to one side of the latch pin 26. This plate, near its free end, provides an abutment 37 disposed in close proximity to the upper periphery of the basket, and then extends outwardly and laterally to constitute a bearing portion 38 against which the collar 30 of the latch engages. The bearing portion 38 is recessed as at 39 near its outer edge to receive the latch pin 26 (see Fig. 7). From this construction it is apparent that any material projecting beyond the periphery of the basket rim during rotation of the latter will engage the abutment 37 forcing the latch pin outwardly against tension of the expansion spring 29, whereupon the inner end of the latch pin will be withdrawn from the opening 27 in the lid skirt 28 and the lid is released to the action of the spring 22 and rotation of the basket shaft is stopped. It will be noted that the spring plate 35 is relatively wide so as to cover the area immediately adjacent to the upper rim of the basket 12 in order that the plate may be operated by engagement of any material protruding beyond the basket rim during rotation of the latter.

From the foregoing, it is apparent that I have provided means which is wholly automatic in operation for bringing about immediate release of the lid in those instances where centrifugal action throws material or parts of material beyond the basket rim, in order to stop the machine before damage can result either to the goods being dried, the machine itself, or to the hands or other parts of the person attending the machine. The device for bringing about this operation is extremely simple in its construction and may be easily and quickly applied to drying machines now in use with little difficulty, and the devices of either form shown and described are positive in their operation.

While the structures here described are addressed to mechanical structures such as springs, for releasing the lid at the critical time, it will be understood that it is well within the concept of the invention to provide electrical means for releasing the latch when the trip member is engaged by clothes or portions thereof projecting outwardly from the rotating basket.

I claim:

1. In combination with an extractor for wet clothes of that type which comprises a casing containing a rotatable extractor basket open at its upper end, a lid to cover said basket, a spring normally urging said cover to open position, a latch to hold said lid in closed position, and means operable upon opening said lid to stop the movement of the basket; the improvement which comprises a movable trip member engaged with said latch and having a portion thereof disposed in the path of clothes projecting outwardly from the rotating basket, whereby the engagement of said projecting clothes with said trip member moves the latch to lid releasing position.

2. In combination with an extractor for wet clothes of that type which comprises a casing containing a rotatable extractor basket open at its upper end, a lid to cover said basket, a spring to urge said lid to open position, a latch to hold said lid in closed position, and means operable upon opening of said lid to stop the movement of the basket; the improvement which comprises a laterally swingable element engaged at one end with said latch and having a portion thereof disposed in the path of any clothes projecting from the rotating basket, whereby the engagement of said projecting clothes with said member moves the latch to lid releasing position.

3. In combination with an extractor for wet clothes of that type which comprises a casing containing a rotatable extractor basket open at its upper end, a lid to cover the open end of said basket, a spring to urge said lid to open position a latch normally holding said lid in closed position, and means actuated upon opening of said lid to actuate means for stopping the rotative movement of the basket; a rod pivoted at one end within the casing and having its free end disposed adjacent to the rim of said basket, an abutment member on said free end disposed adjacent to said basket rim and in the path of movement of clothes projecting therefrom, said rod disposed adjacent to said latch pin, and a spring pressed collar affixed to said latch pin and urging the latter to latching position, said collar being engaged with said rod.

4. In combination with an extractor for wet clothes of that type which comprises a casing containing a rotatable extractor basket open at its upper end, a lid to cover said basket, a spring to urge said cover to open position, a latch to hold said lid in closed position, and means actuated upon opening of said lid to actuate means for stopping the rotative movement of the basket;

a rod pivoted at one end within said casing in offset relationship to said latch, a collar on said latch engaging a portion of said rod, a spring normally holding said collar against said rod and maintaining the latch pin in latched position, and an abutment member at the free end of said rod disposed adjacent to the rim of said basket and in the path of material projecting from said basket when the latter is rotated.

5. In combination with an extractor for wet clothes of that type which comprises a casing containing a rotatable extractor basket open at its upper end, a lid to cover said basket, a spring to urge said lid to open position, a latch to hold said lid in closed position, and means actuated upon opening of said cover for stopping the rotative movement of the basket; the improvement which comprises a spring plate secured at one end in offset relationship to said latch, an abutment portion near the opposite end of said plate disposed adjacent to the rim of said basket and in the path of movement of clothes projecting therefrom, a bearing at the free extremity of said spring plate, a collar secured to said latch pin and engaged with said bearing, and a spring surrounding said latch pin and forcing the same to locked position, and also disposing said abutment in proximity to said basket.

6. In a lid releasing device for washing apparatus, a casing, a basket shaft arranged in upstanding position centrally within said casing, a motor in said casing for rotating said shaft, a basket affixed to said shaft and rotatable therewith and open at its top, a brake for said shaft, a lever movable within said casing to actuate said brake and having an end projecting beyond said casing, a lid hinged to the upper end of said casing and normally closing the open end thereof, a spring tending normally to open said lid, a rod connecting said lid with the outer end of said lever whereby to apply the brake when the lid is opened, a latch pin slidably mounted in said casing, a collar affixed to said pin inwardly from its inner end, a spring interposed between the casing and said collar, a latch releasing member secured at one end within said casing offset from said pin and having a portion thereof interposed between said collar and said basket, and an abutment member at the opposite end of said member normally disposed in close proximity to the periphery of said basket when the latch is engaged with said lid.

References Cited in the file of this patent
UNITED STATES PATENTS

| | | |
|---|---|---|
| 1,203,567 | Bartholomew | Nov. 7, 1916 |
| 1,865,584 | Perry | July 5, 1932 |
| 1,881,974 | Skitt | Oct. 11, 1932 |
| 2,521,054 | Ellis | Sept. 5, 1950 |